1,975,173

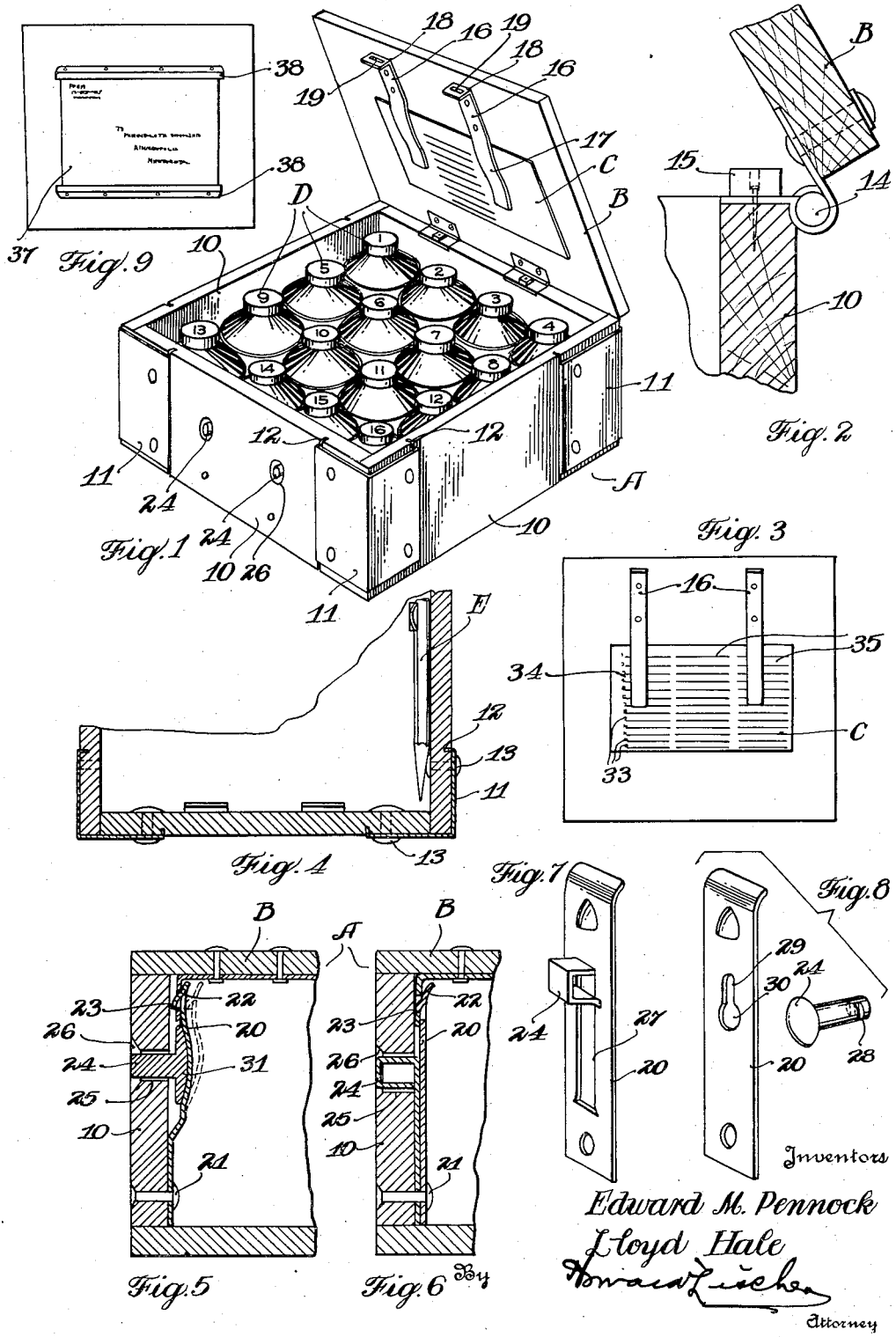
Oct. 2, 1934.  E. M. PENNOCK ET AL  1,975,173
MILK SAMPLE MAILING UNIT
Filed April 3, 1931
Inventors
Edward M. Pennock
Lloyd Hale
Howard Fischer
Attorney Patented Oct. 2, 1934

UNITED STATES PATENT OFFICE 1,975,173

MILK SAMPLE MAILING UNIT

Edward M. Pennock and Lloyd Hale, Minneapolis, Minn., assignors to G. H. Tennant Company, Minneapolis, Minn., a corporation of Minnesota Application April 3, 1931, Serial No. 527,450

2 Claims. (Cl. 206—46)

Our invention relates to a milk sample mailing unit which includes a container made of suitable material and formed to hold a series of cans or receptacles in which the milk from individual cows may be placed so that these samples of milk may be easily sent through the mail.

A feature resides in a mailing unit for milk samples wherein a record may be made of each cow upon a sheet contained within the unit with indicia, such as a number, on the card, to indicate the particular cow, and a corresponding indicia or number on the particular can containing that cow's milk. This enables the farmer to receive this mailing unit for milk samples, place the sample of milk in the can, mark the cow's name or distinguishing designation after the corresponding number which indicates the particular can on the card.

The unit for the milk samples is formed with bottom and side portions which are connected together to form a strong container, the corners being reinforced and a suitable cover hinged or connected to the side in a manner so that when the cover is closed down it will come in close relation to the cans holding them in place while a double snap concealed lock holds the cover closed. The snap lock for the cover is of a nature to prevent accidental opening of the container or unit and by the double locking means a securing means for holding the milk sample mailing unit closed is provided which will not require wrapping or tieing so as to hold the same closed.

It is important to provide a milk sample mailing unit of a character which may be easily used by the farmer without the necessity of wrapping or tieing means to hold the same together and in which the simplicity permits the placing of a series of small containers side by side which have a designating indicia corresponding with the card so that the farmer can quickly and easily place the samples of the milk from the various cows within the unit, lock it closed, and address it to the milk testing station. This service to the dairyman and farmer is one which will be greatly appreciated as it provides a means for the dairyman to keep track of his cows in a systematic manner. The dairyman is interested in having these samples from the various cows at certain intervals so that he can keep up the standard of his herd, and thus prevent losses from unprofitable stock and at the same time, it gives an opportunity for the dairyman to know the condition of the stock from which he has taken the samples, so as to keep a good healthy producing herd. This unit affords the keeping of such a record for a dairyman or farmer in a very easy and simple manner. After the samples have been referred to the milk testing station, whether it is a State institution or an individual laboratory, the container can be returned to the farmer with the report on the card of the individual cows. All of this information is contained in the sample unit which makes it very easy to keep a record and provides a package which may be easily handled in the mail.

The unit may contain the card, a pencil for keeping memoranda on the card and is also provided with spring means for readily lifting the cover when both of the catches of the double lock are released. Should one catch be accidentally released, the other catch would still remain to hold the cover closed. With this double safety we have provided a milk sample mailing unit of a very desirable nature, more particularly for the reason that this unit permits the farmer and dairyman to have periodical tests made of their cows as often as they like, not having to wait, as was formerly the case, until the inspector could call and make the test of the various cows.

The features of the invention will be clearly defined and set forth.

In the drawing forming part of the specification:

Figure 1 is a perspective view of our milk sample mailing unit.

Figure 2 is an enlarged sectional detail of the same.

Figure 3 is an inside view of the cover, showing the card for keeping track of the cows.

Figure 4 is a sectional detail of a portion of the mailing unit.

Figure 5 is a sectional detail of a portion of the mailing unit.

Figure 6 illustrates another sectional detail of the mailing unit.

Figure 7 illustrates one form of catch adaptable for use as a lock for the cover.

Figure 8 is a detail of another form of the lock or catch which may be used to hold the cover of the unit in locked position.

Figure 9 is a small plan view, showing the outside of the cover with the address card thereon.

The milk sample mailing unit A is formed with a boxlike container having side members 10 which are connected together by the angle corner members 11. The side walls 10 of the container A may be made of wood or other suitable material of a lightweight, while the corners are best made from metal or other reinforcing material, and the edges of the corners are adapted to be buried within the slits 12 formed in the sides 10.

The corner plates may further be held in position to clamp the sides 10 together by the rivets 13 which extend through the corner plates of the sides 10 and are riveted over on the inside of the container A so as to form a strong reinforced corner for the container. These corner members also hold the container square at the corners.

The container A is provided with a cover member B hinged at 14 to one of the sides 10. A rubber bumper or block 15 is set in the hinge 14 so as to provide spring means for raising the cover B when it is released.

The cover B carries two spring arms 16 extending along the inside of the same, the free end 17 of which forms holder means for supporting the record card C within the cover B. These spring fingers 16 are securely fastened to the cover and are formed with inturned ends 18 having an opening 19 therein which is adapted to be engaged by the catch 20 carried by the side wall 10 to lock the cover closed. The catch member 20 is held by a suitable rivet 21 with its free end 22 formed with a shoulder 23 which engages in the recess or opening 19 when the cover is in closed position. We provide two catch members 20 to engage each of the spring arms 16 and thus we provide a double locking means for the cover B. The catch members 20 are formed with an operating button 24 which extends through the opening 25 in the wall 10 supporting the catch member 20 and by means of the countersunk portion 26 around the operating button we provide a suitable means of operating the buttons 24 when it is desired. These buttons 24 are set flush with the front surface of the side wall 10 so that normally they will not be operated in the handling of the box or the mailing unit A. With the double catch arms 20 it is necessary that both of these arms be released by pressing on the two buttons 24 in the front of the unit A, otherwise the cover will not be released and this insures the maintaining of the cover in locked position in handling through the mail or accidental opening of the cover.

The catch members 20 may be in the form illustrated in Figures 7 or 8. In the form illustrated in Figure 7 the operating button 24 is formed by cutting out the portion 27 of the body of the member 20, whereas, in Figure 8, the operating button 24 is a separate rivet formed with a slotted end 28 which fits in the reduced portion 29 of the opening 30 formed in the body of the member 20. This portion of the catch for the box A may also be formed in the simple formation as illustrated in Figure 5, where an inverted rivet member with the head 31 bears against the inner surface of the spring arm 20.

The record card C is provided with indicia such as the numerals 33 extending in a column along one edge of the card and indicating the different lines of the card. Suitable indicia may be arranged in the column 34 on the card C to indicate the name of the cow and after this there is a space of several columns such as 35, for other information to be written after the numbers and name of the particular cow.

The container A is adapted to support a series of individual cans D, each of which are numbered with a number corresponding to the numbers indicated by the indicia 33 on the card C. This permits the farmer or dairyman to place the name of the individual cow from whom he has received milk on the card and then place the sample of milk from this particular cow in the container D bearing the same number as indicated on the card C. The farmer then places the card 37 in the holding channels 38 on the outside of the cover with the name of the testing station to which the farmer wishes to send the samples of the milk in the containers D. In fact, the same card 37 may be used to send the empty container A to the farmer, and then it is only necessary for the farmer to turn the card around and this card can have the address of the milk testing station thereon so that all the farmer needs to do is to place the proper postage on the container A and it will be carried by the mails to its destination. A suitable pencil may be provided, such as E, so that the farmer needs no other tools than what are contained in the milk sample mailing unit A.

With this simple, effective and efficient means of supplying the farmer with a device so that he can take the samples of milk often from his herd of cows, the farmer is able to keep a true and accurate record of his herd and thus profit by the advantages of the modern means of giving a report in a quick and simple manner.

In accordance with the patent statutes, we have described the principles of our milk sample mailing unit and we have endeavored to set forth the best embodiment thereof, however, the description and drawing are only suggestive and the invention should be considered within the scope of the following claims.

We claim:

1. A milk sample mailing unit including, a shipping container, a cover hinged thereto, a number of individual containers within said shipping container, distinguishing indicia on each of said individual containers, spring clips secured to said cover, a record card held by said spring clips, indicia on said record card similar to that on said cans, a turned down edge on each of said clips, a spring locking clip on said shipping container engageable with each of said turned down ends on said clips, and means for releasing said locking clips from engagement with said turned down ends.

2. A milk sample mailing unit including, a shipping container, a cover hinged thereto, and locking means for said cover including, a spring clip on said cover, a card secured in place by said spring clip, a down turned end on said spring clip, a locking clip on said container, a locking end thereupon engageable with said down turned end on said spring clip, and means for moving said locking clip out of engagement with said down turned end.

EDWARD M. PENNOCK.
LLOYD HALE.